(12) United States Patent
Suzuki et al.

(10) Patent No.: US 12,731,926 B2
(45) Date of Patent: Sep. 8, 2026

(54) BOARD CONNECTOR AND DEVICE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Toshikazu Suzuki, Osaka (JP); Toshifumi Ichio, Osaka (JP); Daisuke Ito, Osaka (JP); Kazuki Hiramatsu, Mie (JP); Taiga Kadoyama, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 332 days.

(21) Appl. No.: 18/575,962

(22) PCT Filed: Jun. 17, 2022

(86) PCT No.: PCT/JP2022/024297

§ 371 (c)(1),
(2) Date: Jan. 2, 2024

(87) PCT Pub. No.: WO2023/282027

PCT Pub. Date: Jan. 12, 2023

(65) Prior Publication Data

US 2024/0322463 A1 Sep. 26, 2024

(30) Foreign Application Priority Data

Jul. 5, 2021 (JP) ................................ 2021-111387

(51) Int. Cl.
*H01R 12/71* (2011.01)
*H01R 12/72* (2011.01)
(Continued)

(52) U.S. Cl.
CPC ......... *H01R 12/716* (2013.01); *H01R 12/724* (2013.01); *H01R 13/514* (2013.01); *H01R 13/6581* (2013.01)

(58) Field of Classification Search
CPC .. H01R 12/716; H01R 12/724; H01R 13/514; H01R 13/6581; H01R 2103/00; H01R 13/6596; H01R 12/7052; H01R 13/6594
See application file for complete search history.

(56) References Cited

U.S. PATENT DOCUMENTS 6,116,914 A * 9/2000 Koide .................. H01R 13/432 439/63
6,132,253 A * 10/2000 Wu .................... H01R 13/6594 439/607.19

(Continued)

FOREIGN PATENT DOCUMENTS

JP 2015530724 A * 10/2015 ............. H01R 24/52

OTHER PUBLICATIONS

International Search Report issued on Aug. 23, 2022 for WO 2023/282027 A1 (4 pages).

*Primary Examiner* — Abdullah A Riyami
*Assistant Examiner* — Nader J Alhawamdeh
(74) *Attorney, Agent, or Firm* — Venjuris, P.C.

(57) ABSTRACT

A board connector 10 of the present disclosure is to be mounted on a circuit board 50 and provided with a housing 11 including a receptacle 15 open forward and a rear wall 30 provided on a side opposite to a front end part where the receptacle 15 is open, an outer conductor 20 fixed to the housing 11 through the rear wall 30, an insulating dielectric (Continued)

19 disposed inside the outer conductor 20, an inner conductor 18 disposed inside the dielectric 19, and a ground spring 40 to be connected to the outer conductor 20. The outer conductor 20 includes a flange 23 to be disposed along the rear wall 30 of the housing 11. The ground spring 40 includes a mounting piece 46 to be inserted between the rear wall 30 and the flange 23.

6 Claims, 13 Drawing Sheets

(51) Int. Cl.
*H01R 13/514* (2006.01)
*H01R 13/6581* (2011.01)

(56) References Cited

U.S. PATENT DOCUMENTS

| | | | | |
|---|---|---|---|---|
| 7,101,189 | B1 | 9/2006 | Huss et al. | |
| 10,714,868 | B2 * | 7/2020 | Maesoba | H01R 13/521 |
| 11,837,808 | B2 * | 12/2023 | Maesoba | H01R 13/424 |
| 2014/0099822 | A1 | 4/2014 | Duesterhoeft | |
| 2017/0324176 | A1 * | 11/2017 | Ishikawa | H01R 13/6596 |
| 2022/0102885 | A1 | 3/2022 | Maesoba et al. | |
| 2023/0030972 | A1 * | 2/2023 | Yamada | H01R 13/504 |
| 2023/0387633 | A1 * | 11/2023 | Maesoba | H01R 13/6599 |
| 2024/0322463 | A1 * | 9/2024 | Suzuki | H01R 13/514 |
| 2024/0322467 | A1 * | 9/2024 | Suzuki | H01R 13/6582 |
| 2024/0339787 | A1 * | 10/2024 | Suzuki | H01R 13/6594 |

* cited by examiner

BOARD CONNECTOR AND DEVICE

CROSS REFERENCE TO RELATED APPLICATIONS

This application is a national phase of PCT application No. PCT/JP2022/024297, filed on 17 Jun. 2022, which claims priority from Japanese patent application No. 2021-111387, filed on 5 Jul. 2021, all of which are incorporated herein by reference.

TECHNICAL FIELD

The present disclosure relates to a board connector and a device.

BACKGROUND

Conventionally, a board connector described in Japanese Unexamined Patent Publication No. 2020-109738 is known as a board connector to be mounted on a circuit board. This board connector is provided with a connector housing to be mounted on the circuit board, an outer conductor to be attached to the connector housing, a dielectric to be accommodated inside the outer conductor and an inner conductor to be accommodated inside the dielectric. The circuit board is accommodated in an enclosure. The enclosure is provided with a box-shaped lower case open upward and an upper case for closing an opening of the lower case by being assembled with the lower case from above.

To assemble the circuit board with the enclosure, the circuit board is first fixed to the lower case, the upper case is assembled from above the lower case, and the lower case and the upper case are fixed to form the enclosure. At this time, a hole edge part of a lower recess provided in the lower case is brought into contact with the outer surface of the outer conductor and a hole edge part of an upper recess provided in the upper case is brought into contact with the outer surface of the outer conductor. In this way, the outer conductor and the enclosure are electrically connected.

PRIOR ART DOCUMENT

Patent Document

Patent Document 1: JP 2020-109738 A

SUMMARY OF THE INVENTION

Problems to be Solved

In connecting the outer conductor and the enclosure, it may be desired to connect the outer conductor and the enclosure via a ground spring. However, since the ground spring cannot be retrofit in the above board connector, the ground spring cannot be used.

A technique disclosed in this specification was completed on the basis of the above situation and aims to provide a board connector and a device, to which a ground spring can be retrofit.

Means to Solve the Problem

The present disclosure is directed to a board connector to be mounted on a circuit board, the board connector being provided with a housing including a receptacle open forward and a rear wall provided on a side opposite to a front end part where the receptacle is open, an outer conductor fixed to the housing through the rear wall, an insulating dielectric disposed inside the outer conductor, an inner conductor disposed inside the dielectric, and a ground spring to be connected to the outer conductor, the outer conductor including a flange to be disposed along the rear wall of the housing, and the ground spring including a mounting piece to be inserted between the rear wall and the flange.

Effect of the Invention

According to the present disclosure, it is possible to provide a board connector, to which a ground spring can be retrofit.

DETAILED DESCRIPTION TO EXECUTE THE INVENTION

Description of Embodiments of Present Disclosure

Figure 1:
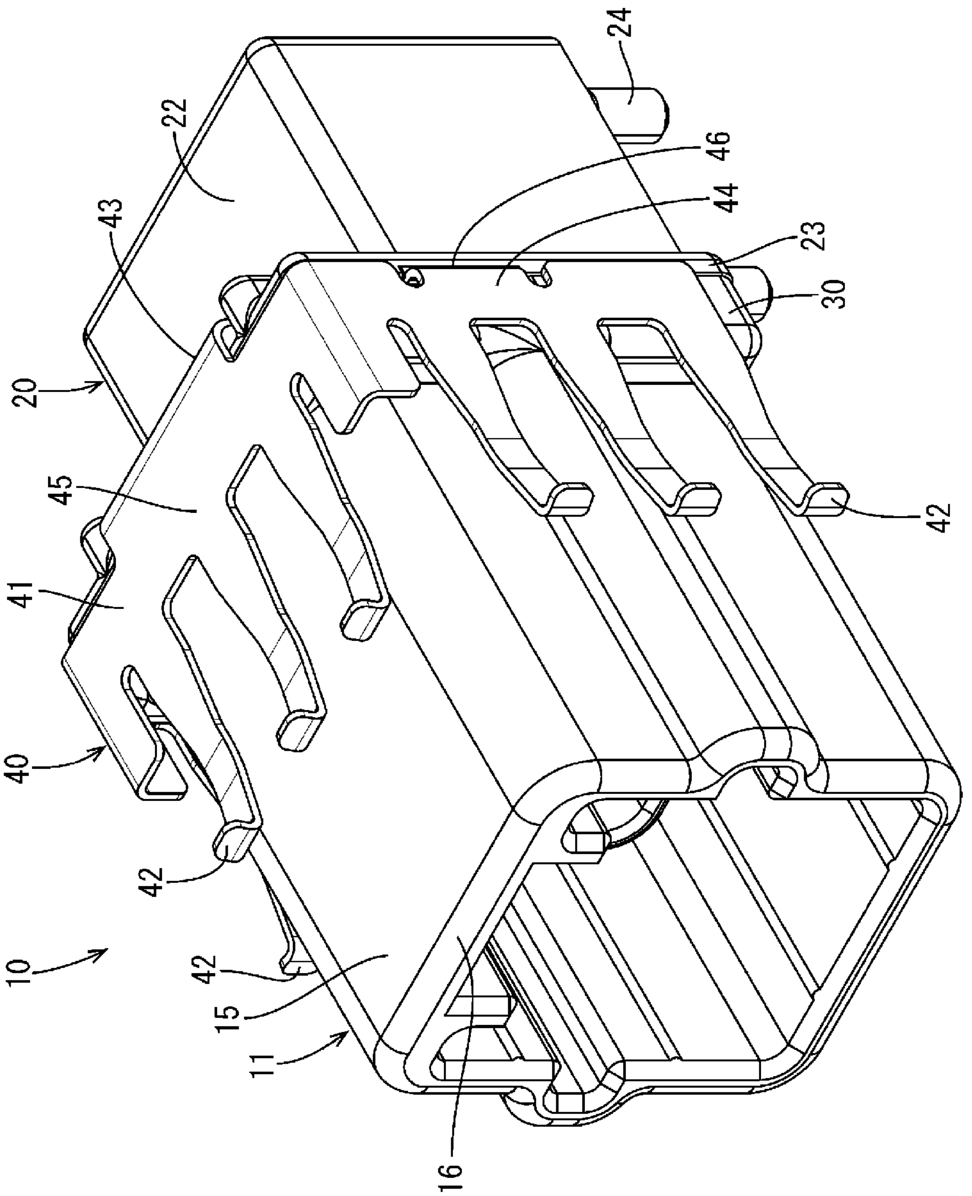
FIG. 1 is a perspective view showing a board connector of a first embodiment.

First, embodiments of the present disclosure are listed and described.

(1) The board connector of the present disclosure is to be mounted on a circuit board, and provided with a housing including a receptacle open forward and a rear wall provided on a side opposite to a front end part where the receptacle is open, an outer conductor fixed to the housing through the rear wall, an insulating dielectric disposed inside the outer conductor, an inner conductor disposed inside the dielectric, and a ground spring to be connected to the outer conductor, the outer conductor including a flange to be disposed along the rear wall of the housing, and the ground spring including a mounting piece to be inserted between the rear wall and the flange.

The device of the present disclosure is provided with the board connector, a circuit board having the board connector mounted thereon, and an enclosure made of metal, the circuit board being accommodated inside the enclosure, the enclosure being electrically connected to the outer conductor via the ground spring.

Since the ground spring includes the mounting piece to be inserted between the rear wall of the housing and the flange of the outer conductor, the ground spring can be retrofit to the board connector mounted on the circuit board. Further, since the outer conductor and the enclosure made of metal can be electrically connected via the ground spring, a connected state is stable and shielding performance can be improved.

(2) Preferably, the ground spring includes a gate-shaped mounting body portion and a plurality of connection springs projecting forward from a front edge of the mounting body portion, and the mounting piece is provided to project inward from a rear edge of the mounting body portion.

Since the mounting body portion is gate-shaped, the ground spring can be mounted on the board connector from above or laterally and the mounting piece can be inserted between the rear wall and the flange. Since the connection springs project forward from the front edge of the mounting body portion, the connection springs can be brought into contact with the enclosure from behind.

(3) Preferably, the mounting body portion includes a pair of arm portions and a coupling portion coupling the pair of arm portions, and a plurality of the connection springs are provided on each of both the pair of arm portions and the coupling portion or each of either the pair of arm portions or the coupling portion.

Since the plurality of connection springs are provided on each of both the pair of arm portions and the coupling portion or each of either the pair of arm portions or the coupling portion, shield connection to the enclosure is possible at multiple contact points and shielding performance can be further improved.

(4) Preferably, the flange includes a locking recess for retaining the ground spring by accommodating the mounting piece inside.

Since the ground spring is retained by accommodating the mounting piece inside the locking recess, a mounted state of the ground spring on the outer conductor is stable.

(5) Preferably, the ground spring includes a holding spring to be brought into resilient contact with the flange from behind.

Since the ground spring is held on and electrically connected to the outer conductor by bringing the holding spring into resilient contact with the flange from behind, a connected state of the ground spring to the outer conductor is stable.

Details of First Embodiment of Present Disclosure

Specific examples of a board connector 10 and a device 60 of the present disclosure are described with reference to FIGS. 1 to 10. Note that the present disclosure is not limited to these illustrations, but is represented by claims and intended to include all changes in the scope of claims and in the meaning and scope of equivalents.

[Overall Structures of Board Connector and Device]

Figure 9:
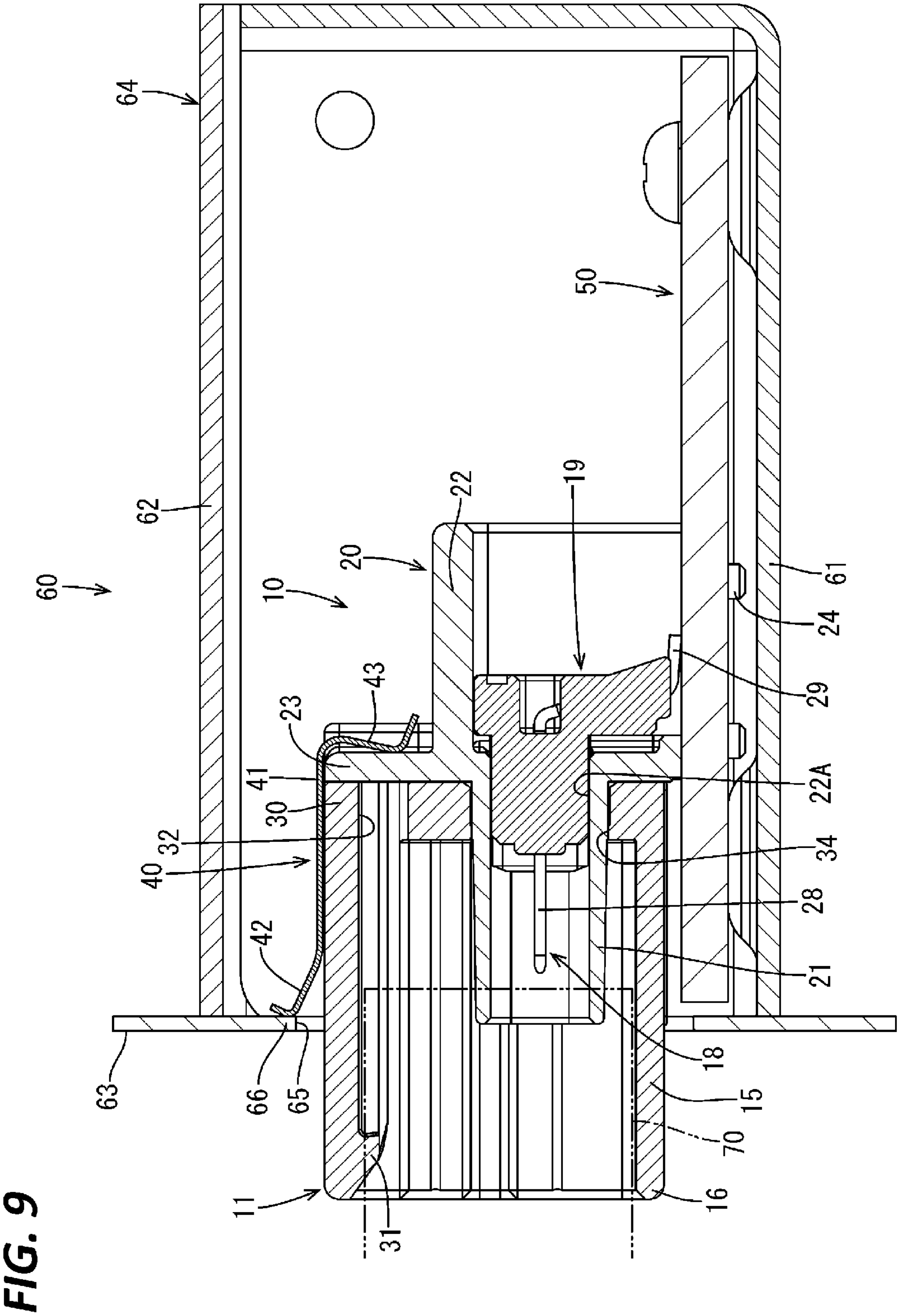
FIG. 9 is a longitudinal section showing an enclosure electrically connected to the outer conductor via the ground spring.
Figure 10:
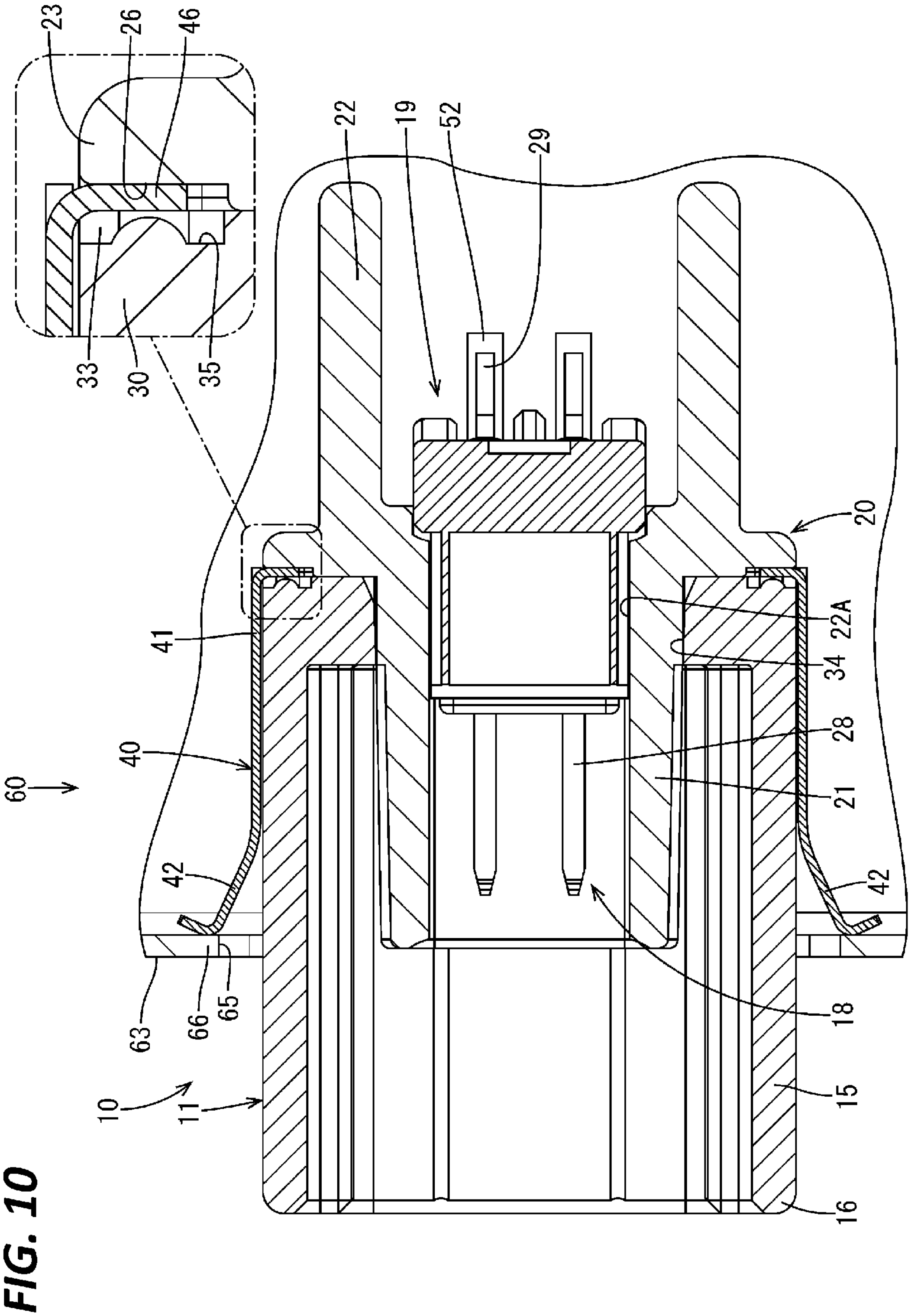
FIG. 10 is a transverse section showing the enclosure electrically connected to the outer conductor via the ground spring.

A board connector 10 according to this embodiment is mounted on a circuit board 50 accommodated inside a device 60 as shown in FIGS. 9 and 10. In FIG. 9, a left side based on a lateral direction is referred to as a front side concerning a front-rear direction, and a vertical direction is based on a vertical direction shown in FIG. 9. Further, for a plurality of identical members, only some members may be denoted by a reference sign and the other members may not be denoted by the reference sign.

[Device]

As shown in FIG. 9, the device 60 is provided with a lower case 61 open on upper and front sides, an upper case 62 for closing an upper opening of the lower case 61 by being assembled with the lower case 61 from above, and a front panel 63 for closing a front opening of the lower case 61 by being assembled with the lower case 61 from front. The lower case 61, the upper case 62 and the front panel 63 are made of electrically conductive metal. The lower case 61, the upper case 62 and the front panel 63 are integrally assembled by a known method such as a method using locking structures, whereby an enclosure 64 is formed. The enclosure 64 has a rectangular parallelepiped shape as a whole.

The front panel 63 is provided with a connector insertion hole 65, through which a part of the board connector 10 is inserted. A front wall 66 constituting the connector insertion hole 65 is a wall for shield connection to be resiliently contacted by a ground spring 40 to be described later from behind.

Figure 2:
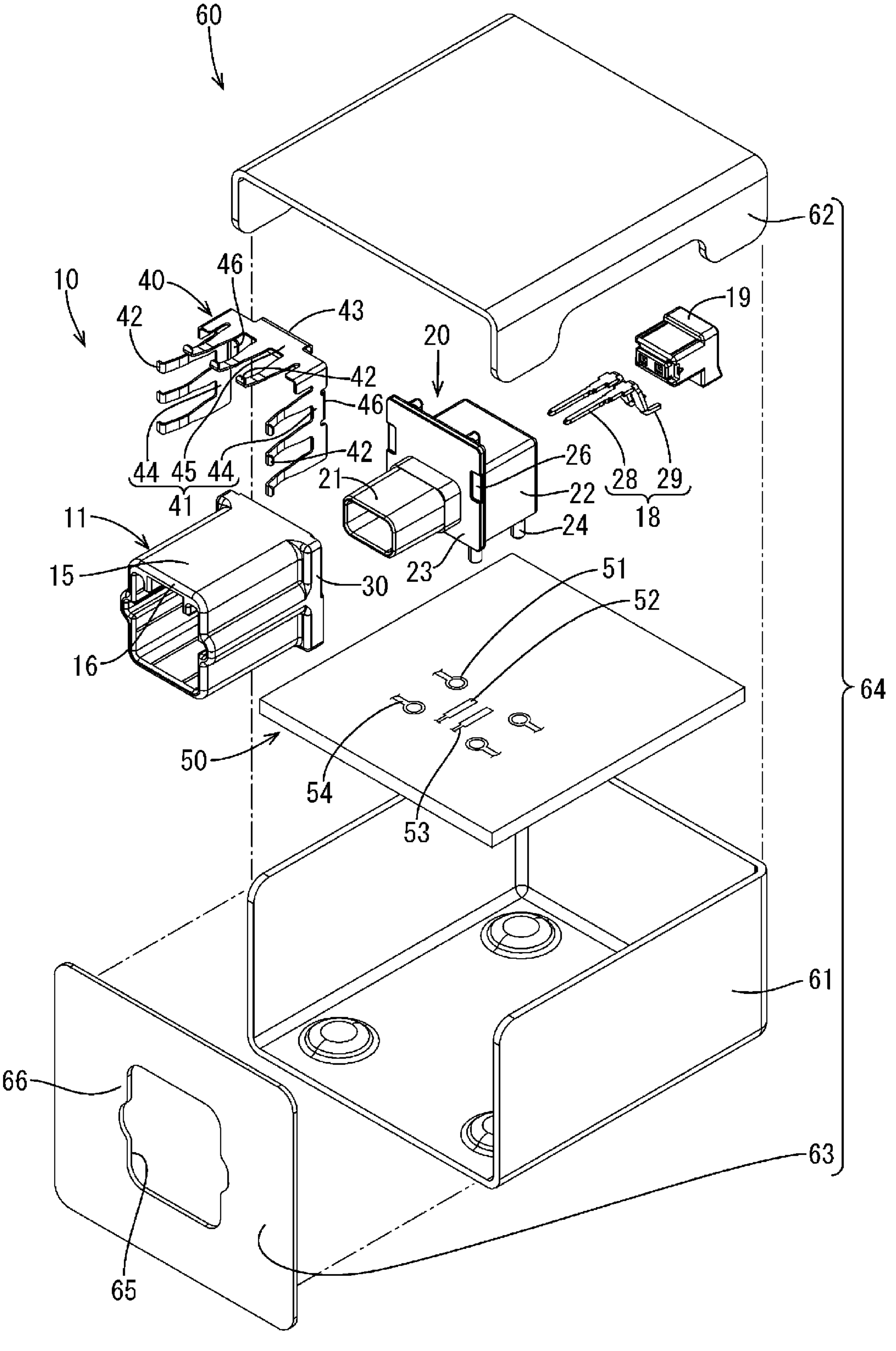
FIG. 2 is an exploded perspective view of the board connector.

The circuit board 50 is accommodated in the enclosure 64. The circuit board 50 is fixed to the enclosure 64 by a known method such as screwing. As shown in FIG. 2, the circuit board 50 is formed with signal electrically conductive paths 53, in which signals are transmitted, and ground electrically conductive paths 54 by etching an copper foil by known printed wiring technique. A plurality of (four in this embodiment) outer conductor through holes 51 and a plurality of (two in this embodiment) inner conductor lands 52 are formed at positions near a front end part of the circuit board 50. An electrically conductive path (not shown) is formed on the inner peripheral surface of the outer conductor through hole 51 by through hole copper plating or the like.

The electrically conductive path formed on the inner peripheral surface of the outer conductor through hole 51 is electrically connected to the ground electrically conductive path 54. Further, an electrically conductive path formed on the surface of the inner conductor land 52 constitutes a part of the signal electrically conductive path 53. Unillustrated electronic components are connected to the signal electrically conductive paths 53 and the ground electrically conductive paths 54 of the circuit board 50 by a known method such as soldering.

[Board Connector]

As shown in FIG. 9, the board connector 10 includes a housing 11 to be mounted on the circuit board 50, an outer conductor 20 to be attached to the housing 11, a dielectric 19 to be accommodated inside the outer conductor 20, inner conductors 18 to be accommodated inside the dielectric 19 and the ground spring 40 to be connected to the outer conductor 20.

[Housing]

The housing 11 is formed by injection-molding an insulating synthetic resin. The housing 11 includes a receptacle 15, which is open forward and into which a mating connector 70 is fit, and a rear wall 30 provided on a side opposite to a front end side (opening end part) 16 where the receptacle 15 is open. A lock portion 31 projecting downward is provided on the front end edge (opening end part) of the inner wall of the receptacle 15. The lock portion 31 is locked to a lock arm (not shown) provided on the mating connector 70, thereby holding the mating connector 70 in a state fit in the receptacle 15.

The rear wall 30 is located on a rear end part of the housing 11. As shown in FIG. 2, the rear wall 30 is larger than the receptacle 15 in the lateral direction and has the same size as the receptacle 15 in the vertical direction. As shown in FIG. 9, a mold removal hole 32 for forming the lock portion 31 in injection-molding the housing 11 is formed to penetrate in the front-rear direction at a position of the rear wall 30 behind the lock portion 31. An outer conductor mounting hole 34, through which the outer conductor 20 is inserted, is formed to penetrate in the front-rear direction below the mold removal hole 32 in the rear wall 30. The inner peripheral surface of the outer conductor mounting hole 34 has a rectangular shape with rounded corners when viewed from behind.

[Outer Conductor]

As shown in FIG. 2, the outer conductor 20 is made of electrically conductive metal. An arbitrary metal such as copper, copper alloy, aluminum or aluminum alloy can be appropriately selected as a metal for constituting the outer conductor 20. The outer conductor 20 is formed by a known method such as casting, die casting or cutting. The outer conductor 20 is brought into electrical contact with a mating outer conductor (not shown) accommodated in the mating connector 70.

The outer conductor 20 includes a tube portion 21 extending in the front-rear direction and having a tubular shape, a dielectric surrounding portion 22 extending rearward from the rear end edge of the tube portion 21 and a flange 23 projecting in a direction intersecting the front-rear direction on a boundary part between the tube portion 21 and the dielectric surrounding portion 22.

Figure 6:
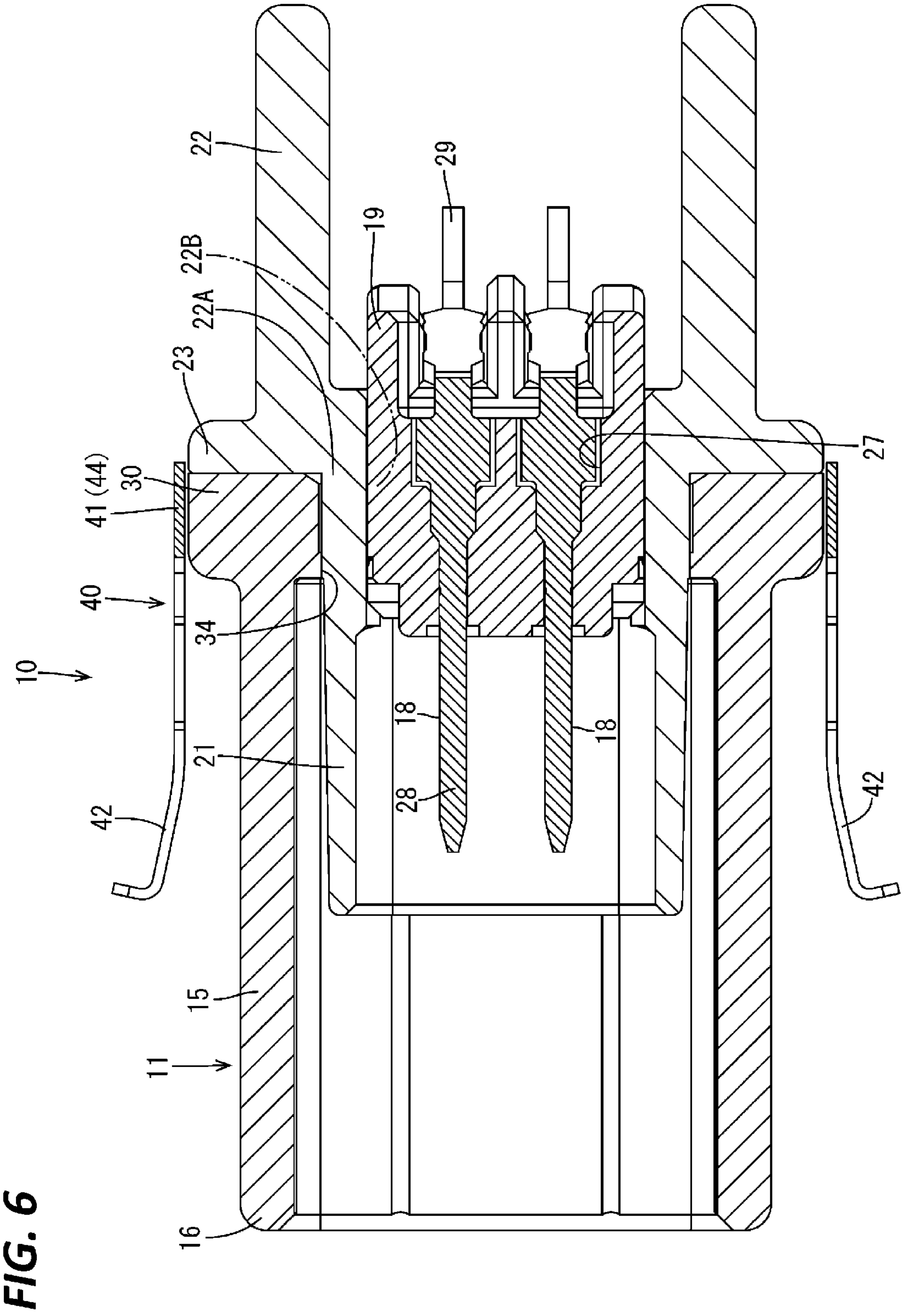
FIG. 6 is a section showing a state where a dielectric is held in an outer conductor.

As shown in FIG. 6, a dielectric holding portion 22A for holding the dielectric 19 inside is provided to be open in the front-rear direction in the boundary part between the tube portion 21 and the dielectric surrounding portion 22. A plurality of retaining protrusions 22B for preventing the dielectric 10 from coming out rearward by biting into the dielectric 19 are provided on the inner wall of the dielectric holding portion 22A.

The outer peripheral surface of the tube portion 21 has a rectangular shape with rounded corners when viewed from front. The outer peripheral shape of the tube portion 21 is set to have substantially the same size as the inner peripheral shape of the outer conductor mounting hole 34 of the rear wall 30. In this way, the tube portion 21 can be press-fit into the outer conductor mounting hole 34 from behind.

The dielectric surrounding portion 22 has a gate shape open downward when viewed from behind. The dielectric 19 is accommodated inside the dielectric surrounding portion 22 while being surrounded on upper, left and right sides by the dielectric surrounding portion 22.

As shown in FIG. 2, a plurality of (four in this embodiment) cylindrical board connecting portions 24 projecting downward are provided on a lower end part of the dielectric surrounding portion 22. The board connecting portion 24 is inserted into the outer conductor through hole 51 of the circuit board 50 and connected to the conductive path formed on the inner surface of the outer conductor through hole 51 by a known method such as soldering. In this way, the outer conductor 20 is electrically connected to the ground electrically conductive paths 54 formed in the circuit board 50.

Figure 5:
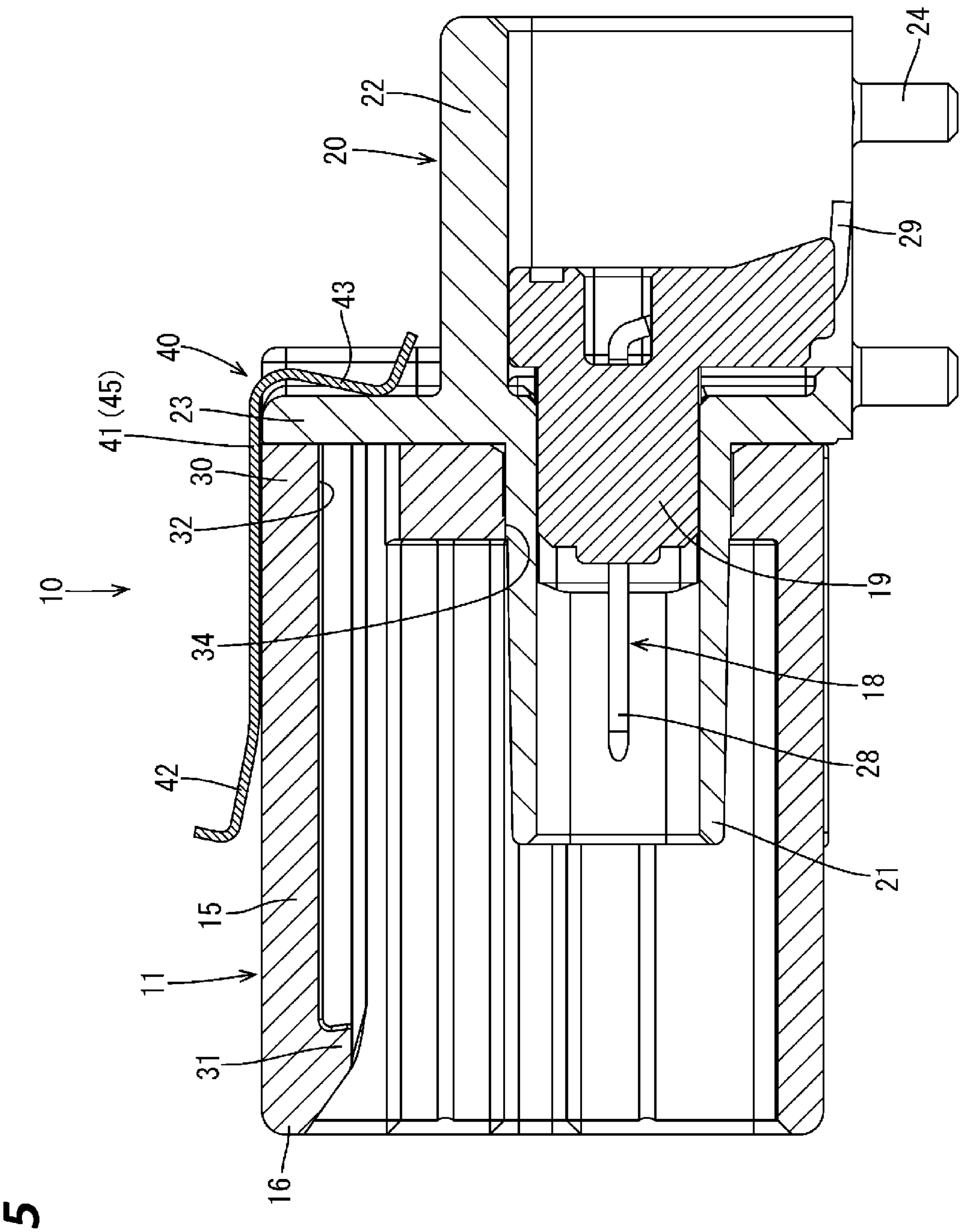
FIG. 5 is a section showing a state where a holding spring is in resilient contact with a flange from behind.

As shown in FIG. 5, with the tube portion 21 press-fit to the inner peripheral wall of the outer conductor mounting hole 34, the flange 23 is in contact with the rear surface of the rear wall 30 from behind. In this way, the mold removal hole 32 of the rear wall 30 is closed from behind by the flange 23.

[Dielectric]

As shown in FIG. 2, the dielectric 19 is formed by injection-molding an insulating synthetic resin. The dielectric 19 is formed to have a substantially L-shaped cross-section. The dielectric 19 includes inner conductor accommodation chambers 27 capable of accommodating the inner conductors 18 inside. As shown in FIG. 6, the inner conductor accommodation chamber 27 is formed to penetrate through the dielectric 19 in the front-rear direction and also be open on a lower surface side.

[Inner Conductors]

The inner conductor 18 is made of electrically conductive metal. An arbitrary metal such as copper, copper alloy, aluminum or aluminum alloy can be appropriately selected as a metal for constituting the inner conductor 18. The inner conductor 18 is formed by a known method such as press-working or cutting. The inner conductor 18 is electrically connected to a mating inner conductor (not shown) accommodated in the mating connector 70.

As shown in FIG. 2, the inner conductor 18 is formed by bending a tab-like metal plate halfway. The inner conductor 18 is formed into a step-like bent shape as a whole by being bent twice. The inner conductor 18 includes a terminal connecting portion 28 to be connected to the mating inner conductor (not shown) and a board connecting portion 29 to be connected to the inner conductor land 52 of the circuit board 50.

As shown in FIG. 5, the terminal connecting portion 28 is shaped to extend in the front-rear direction and projects further forward than the front end of the dielectric 19. On the other hand, the board connecting portion 29 is somewhat inclined as compared to the terminal connecting portion 28, and shaped to extend downward toward a rear side. Thus, the board connecting portion 29 is electrically connected to the signal electrically conductive path 53 of the circuit board 50 by being surface-mounted on the inner conductor land 52 by solder.

[Ground Spring]

Figure 3:
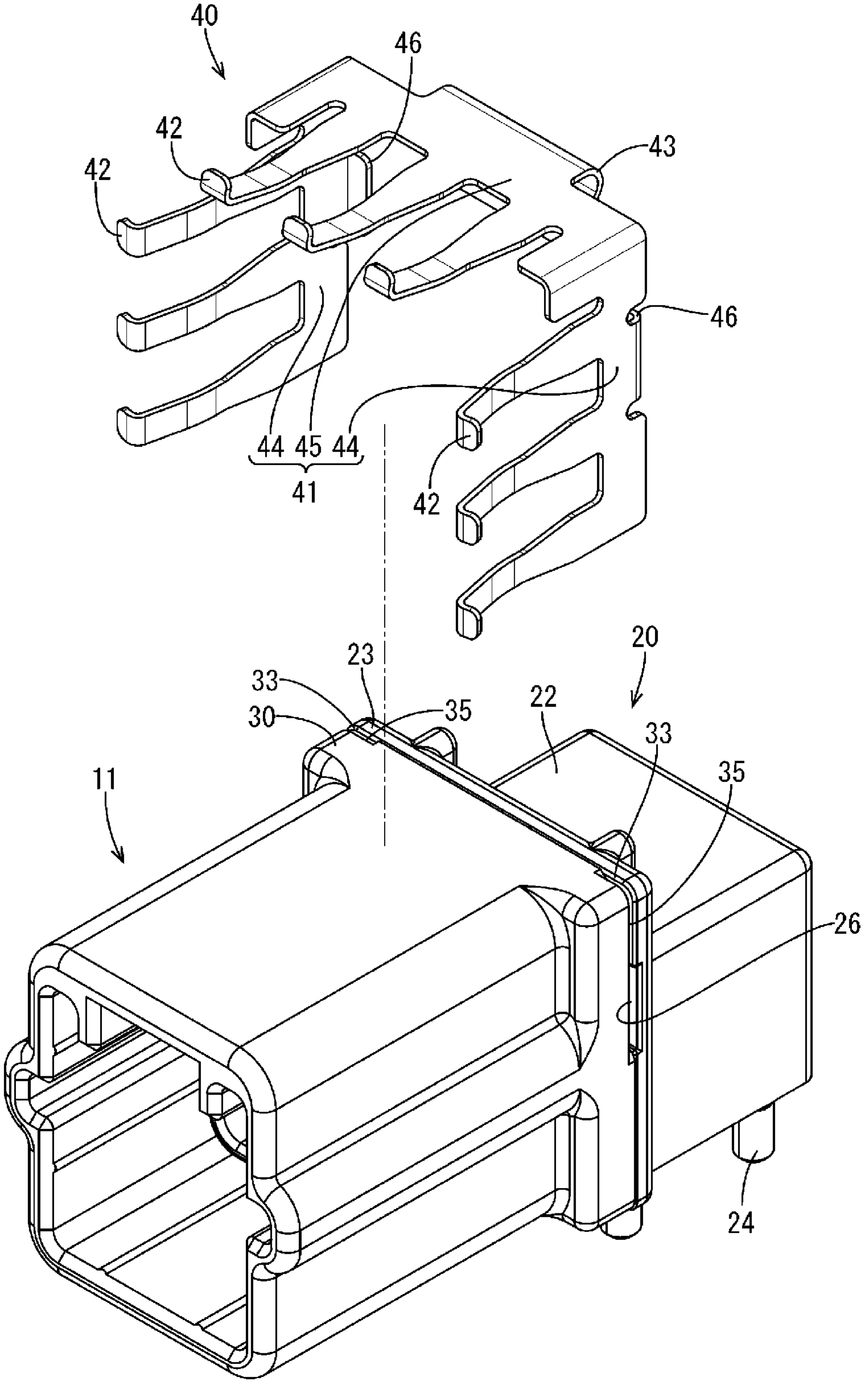
FIG. 3 is a perspective view showing the board connector before a ground spring is mounted.

The ground spring 40 is made from an electrically conductive metal plate. An arbitrary metal such as copper, copper alloy, aluminum or aluminum alloy can be appropriately selected as a metal for constituting the ground spring 40. The ground spring 40 is formed by a known method such as press-working or cutting. As shown in FIG. 3, the ground spring 40 can be retrofit to the outer conductor 20. Retrofitting means that the ground spring 40 can be mounted on the outer conductor 20 after the board connector 10 having the ground spring 40 not mounted thereon yet is mounted on the circuit board 50.

The ground spring 40 includes a gate-shaped mounting body portion 41 and a plurality of connection springs 42 projecting forward from the front edge of the mounting body portion 41. The mounting body portion 41 includes a pair of arm portions 44 arranged in parallel at a predetermined interval in the lateral direction and a coupling portion 45 coupling the base ends of the pair of arm portions 44.

A plurality of (three in this embodiment) the connection springs 42 are provided on each of one arm portion 44, the other arm portion 44 and the coupling portion 45.

A pair of mounting pieces 46 having a rectangular shape long in the vertical direction are provided to project inward on the rear edges of the pair of arm portions 44. One mounting piece 46 projects toward the other mounting piece

46, and the other mounting piece 46 projects toward the one mounting piece 46. The pair of mounting pieces 46 are arranged side by side in the lateral direction. The mounting piece 46 has a vertical dimension, which is equal to or less than half the vertical dimension of the arm portion 44. The mounting piece 46 is provided at a position near the coupling portion 45 on the arm portion 44.

A holding spring 43 is provided on the rear edge of the coupling portion 45. The holding spring 43 extends downward from a central part of the coupling portion 45 and is formed into a chevron shape having a top on a front side. The holding spring 43 is flexible and in resilient contact with the rear surface of the flange 23 from behind in a state mounted on the outer conductor 20.

[Mounting Structure of Ground Spring]

Figure 7:
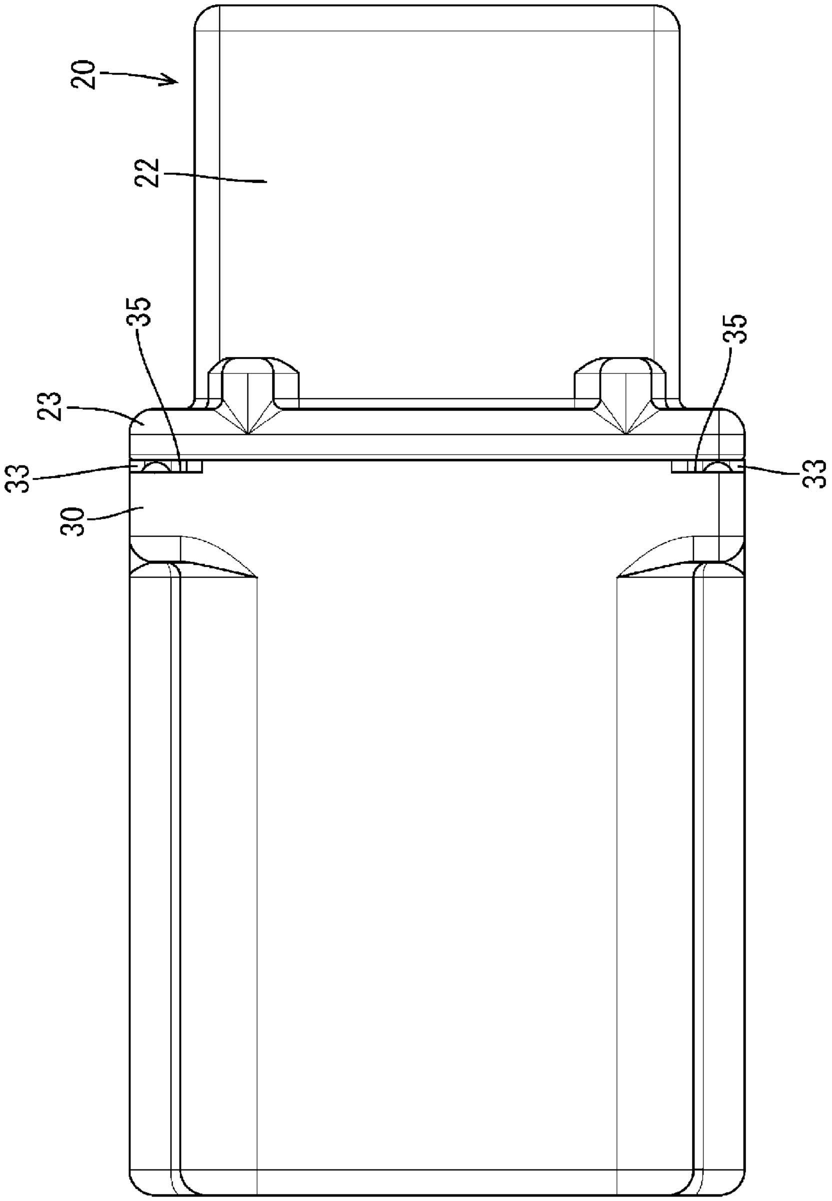
FIG. 7 is a plan view of the board connector having the ground spring removed therefrom.
Figure 8:
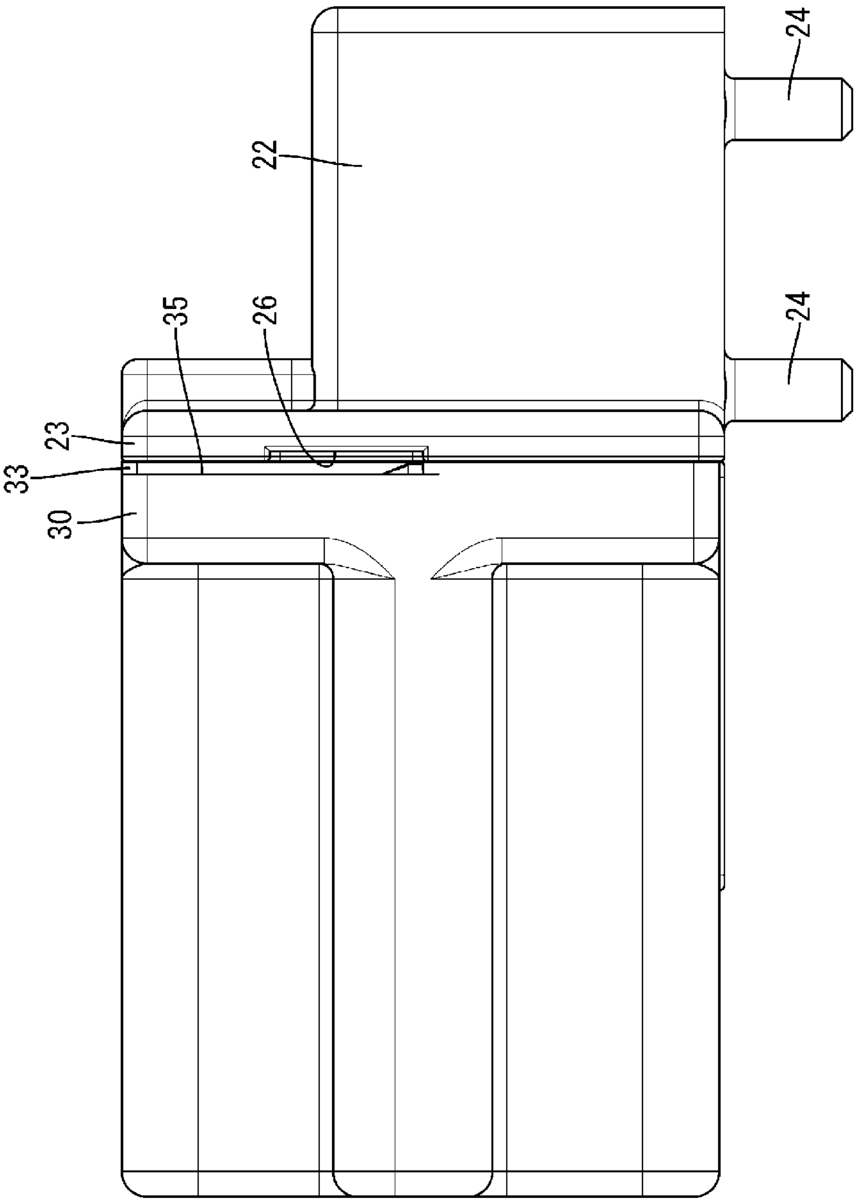
FIG. 8 is a side view of the board connector having the ground spring removed therefrom.

As shown in FIGS. 7 and 8, a pair of mounting recesses 35 are provided on both left and right sides of the rear surface of the rear wall 30 of the housing 11. The mounting recess 35 is formed by recessing the rear surface of the rear wall 30 forward. With the housing 11 and the outer conductor 20 assembled, mounting grooves 33 are formed by the mounting recesses 35 and the flange 23. The mounting groove 33 is located between the rear wall 30 and the flange 23 and is open upward and laterally. The mounting groove 33 located on a left side in a front view is open upward and leftward, and the mounting groove 33 located on a right side in the front view is open upward and rightward. As shown in FIG. 3, the pair of mounting pieces 46 of the ground spring 40 are inserted into the pair of mounting grooves 33.

A dimension in the front-rear direction of the mounting groove 33 is equal to or somewhat larger than a plate thickness of the mounting piece 46. A vertical dimension of the mounting groove 33 is about half the vertical dimension of the rear wall 30 and formed from the upper end to a vertical central part of the rear wall 30.

Figure 4:
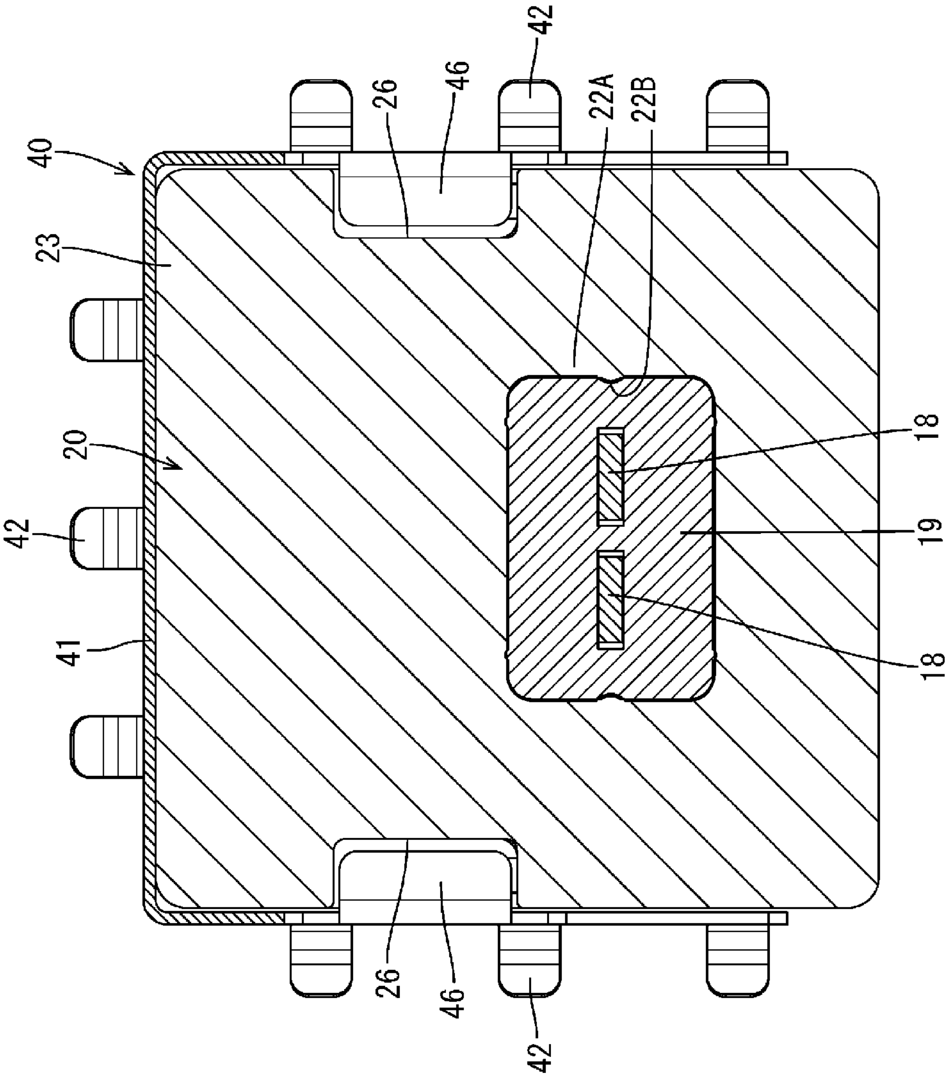
FIG. 4 is a section showing a state where mounting pieces are accommodated inside locking recesses.

If the ground spring 40 is assembled from above with the board connector 10 having the ground spring 40 not mounted thereon yet, the pair of mounting pieces 46 are respectively inserted into the pair of mounting grooves 33. When the ground spring 40 reaches a proper mount position, the holding spring 43 resiliently contacts the flange 23 from behind and the mounting pieces 46 are fit into the locking recesses 26 from front and resiliently contact the front surfaces of the locking recesses 26 (see FIG. 10). As shown in FIG. 4, with the pair of mounting pieces 46 fit in the pair of locking recesses 26, the upper edges of the pair of mounting pieces 46 are locked to the upper edges of the pair of locking recesses 26 from below, whereby the ground spring 40 is held not to come out upward.

[Connection Structure of Ground Spring and Front Panel]

As shown in FIG. 9, the holding spring 43 is in resilient contact with the rear surface of the flange 23 and the connection springs 42 on the upper side are in resilient contact with the front wall 66 of the front panel 63. Further, as shown in FIG. 10, the pair of mounting pieces 46 are in resilient contact with the front surfaces of the pair of locking recesses 26 of the flange 23, and the connection springs 42 on both left and right sides are in resilient contact with the front wall 66 of the front panel 63. Thus, an electrically conductive path from the flange 23 to the front panel 63 is shortest, wherefore shielding performance can be improved.

The electrically conductive path extending from the holding spring 43 of the ground spring 40 to the front wall 66 of the front panel 63 is branched into a plurality of parts by the plurality of connection springs 42 and the electrically conductive path extending from each mounting piece 46 to the front wall 66 of the front panel 63 is also branched into a plurality of parts by the plurality of connection springs 42. Since the ground spring 40 is connected to the front panel 63 at multiple contact points in this way, resistance at each contact point is reduced and shielding performance can be further improved.

[Assembly Method of Board Connector and Device]

Next, an example of an assembly method of the board connector 10 and the device 60 of this embodiment is described. The assembly method of the board connector 10 and the device 60 is not limited to the one described below.

The inner conductors 18 are inserted into the inner conductor accommodation chambers 27 of the dielectric 19 from behind. Subsequently, the inner conductors 18 are assembled with the outer conductor 20 from behind. In this way, a part of the dielectric 19 extending in the front-rear direction is press-fit into the dielectric holding portion 22 of the outer conductor 20 and the dielectric 19 is held retained by the retaining protrusions 22B. In this state, the terminal connecting portions 28 of the inner conductors 18 are accommodated inside the tube portion 21 (see FIG. 9).

Subsequently, the tube portion 21 of the outer conductor 20 is inserted into the outer conductor mounting hole 34 of the housing 11 from behind and the dielectric holding portion 22A is press-fit into the outer conductor mounting hole 34. In this way, the board connector 10 is completed and the flange 23 is disposed along the rear wall 30 of the housing 11.

Subsequently, the board connector 10 is assembled with the circuit board 50 from above. The board connecting portions 24 of the outer conductor 20 are inserted into the outer conductor through holes 51 of the circuit board 50 from above, and the board connecting portions 29 of the inner conductors 18 are placed on the inner conductor lands 52 of the circuit board 50 from above and soldered, whereby the board connecting portions 29 and the inner conductor lands 52 are electrically connected.

Here, it may be desired to connect the outer conductor 20 to the enclosure 64 via the ground spring 40 after the board connector 10 is assembled with the circuit board 50. In this case, the ground spring 40 is mounted on the board connector 10 from above and the pair of mounting pieces 46 are inserted into the pair of mounting grooves 33 from above. When the ground spring 40 reaches a proper mount position, the holding spring 43 resiliently contacts the flange 23 from behind and the pair of mounting pieces 46 resiliently contact the pair of locking recesses 26 from front. In this way, the ground spring 40 is electrically connected to the outer conductor 20 at a plurality of positions (three positions in this embodiment).

Subsequently, the circuit board 50 is fixed to the lower case 61, such as by screwing. By assembling the upper case 62 from above the lower case 61 and assembling the front panel 63 from the front of the lower case 61, the lower case 61, the upper case 62 and the front panel 63 are fixed, such as by screwing. In this way, the enclosure 64 is configured and the board connector 10 and the circuit board 50 are accommodated inside the enclosure 64 with the receptacle 15 passed through the connector insertion hole 65.

At this time, front end parts of the plurality of connection springs 42 are pressed against and brought into resilient contact with the front wall 66 of the front panel 63 from behind. In this way, the ground spring 40 is electrically connected to the enclosure 64 at multiple contact points. Accordingly, the outer conductor 20 is shield-connected to the enclosure 64 via the ground spring 40. Apart from this, the outer conductor 20 is shield-connected to the enclosure 64 via the plurality of board connecting portions 24 and the circuit board 50, but a distance to the enclosure 64 can be short and the ground spring 40 resiliently contacts the enclosure 64 with shield connection by the ground spring 40. Thus, a connected state is stable and shielding performance can be improved. That is, since the flange 23 is sandwiched by the holding spring 43 and the mounting pieces 46, a sufficient contact pressure can be secured and stable shield connection is possible.

Subsequently, the board connector 10 and the mating connector 70 are connected. If the mating connector 70 is fit into the receptacle 15, the lock arm (not shown) provided on the mating connector 70 is locked to the lock portion 31. In this way, the mating connector 70 is held retained in the housing 11. The inner conductors 18 of the board connector 10 are electrically connected to the mating inner conductors (not shown) of the mating connector 70. Further, the outer conductor 20 of the board connector 10 is electrically connected to the mating outer conductor (not shown) of the mating connector 70.

Functions and Effects of First Embodiment

The board connector 10 of the present disclosure is to be mounted on the circuit board 50 and provided with the housing 11 including the receptacle 15 open forward and the rear wall 30 provided on the side opposite to the front end part 16 where the receptacle 15 is open, the outer conductor 20 fixed to the housing 11 through the rear wall 30, the insulating dielectric 19 disposed inside the outer conductor 20, the inner conductors 18 disposed inside the dielectric 19 and the ground spring 40 to be connected to the outer conductor 20. The outer conductor 20 includes the flange 23 disposed along the rear wall 30 of the housing 11. The ground spring 40 includes the mounting pieces 46 to be inserted between the rear wall 30 and the flange 23.

The device 60 of the present disclosure is provided with the board connector 10, the circuit board 50 having the board connector 10 mounted thereon, and the enclosure 64 made of metal, configured to accommodate the circuit board 50 inside and electrically connected to the outer conductor 20 via the ground spring 40.

Since the ground spring 40 includes the mounting pieces 46 to be inserted between the rear wall 30 of the housing 11 and the flange 23 of the outer conductor 20, the ground spring 40 can be retrofit to the board connector 10 mounted on the circuit board 50. Further, since the outer conductor 20 and the enclosure 64 made of metal can be electrically connected via the ground spring 40, the connected state is stable and shielding performance can be improved.

The ground spring 40 includes the gate-shaped mounting body portion 41 and the plurality of connection springs 42 projecting forward from the front edge of the mounting body portion 41, and the mounting pieces 46 are provided to project inward from the rear edge of the mounting body portion 41.

Since the mounting body portion 41 is gate-shaped, the ground spring 40 can be mounted on the board connector 10 from above and the mounting pieces 46 can be inserted between the rear wall 30 and the flange 23. Since projecting forward from the front edge of the mounting body portion 41, the connection springs 42 can be brought into contact with the enclosure 64 from behind.

The mounting body portion 41 includes the pair of arm portions 44 and the coupling portion 45 coupling the pair of arm portions 44, and the plurality of connection springs 42 are provided on each of both the pair of arm portions 44 and the coupling portion 45.

Since the plurality of connection springs 42 are provided on each of both the pair of arm portions 44 and the coupling portion 45, shield connection to the enclosure 64 is possible at multiple contact points and shielding performance can be further improved.

The flange 23 includes the locking recesses 26 for retaining the ground spring 40 by accommodating the mounting pieces 46 inside.

Since the ground spring 40 is retained by accommodating the mounting pieces 46 inside the locking recesses 26, the mounted state of the ground spring 40 on the outer conductor 20 is stable.

The ground spring 40 includes the holding spring 43 to be brought into resilient contact with the flange 23 from behind.

Since the ground spring 40 is held on and electrically connected to the outer conductor 20 by bringing the holding spring 43 into resilient contact with the flange 23 from behind, the connected state of the ground spring 40 to the outer conductor 20 is stable. That is, since the flange 23 is sandwiched by the holding spring 43 and the mounting pieces 46, a sufficient contact pressure can be secured and stable shield connection is possible.

Details of Second Embodiment of Present Disclosure

Specific examples of a board connector 210 and a device 260 of the present disclosure are described with reference to FIGS. 11 to 13. In the following description, the same components as in the first embodiment are not described and reference sings obtained by adding 200 to numeric parts of the reference signs are used for components corresponding to those of the first embodiment.

[Overall Structures of Board Connector and Device]

Figure 11:
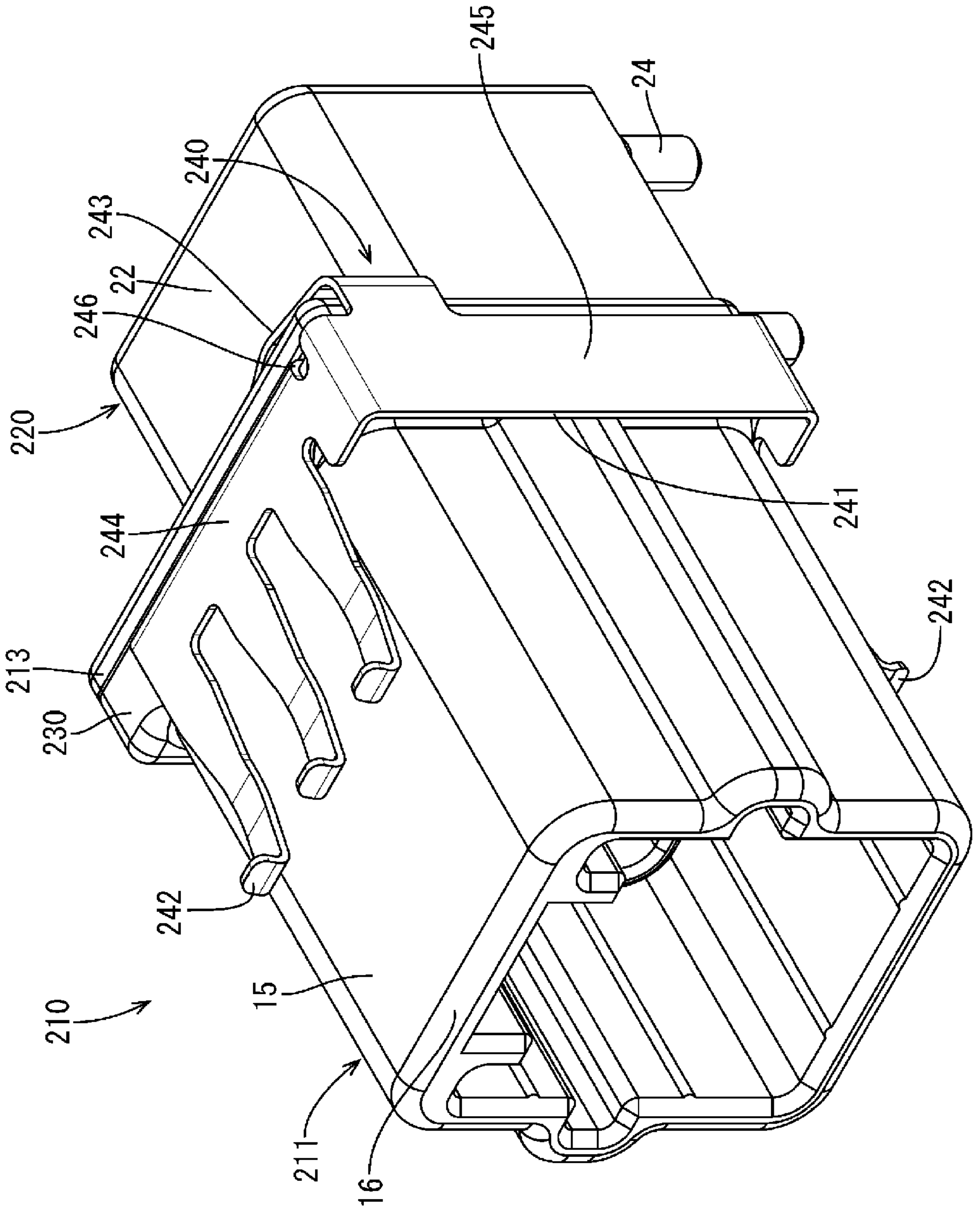
FIG. 11 is a perspective view showing a board connector of a second embodiment.
Figure 12:
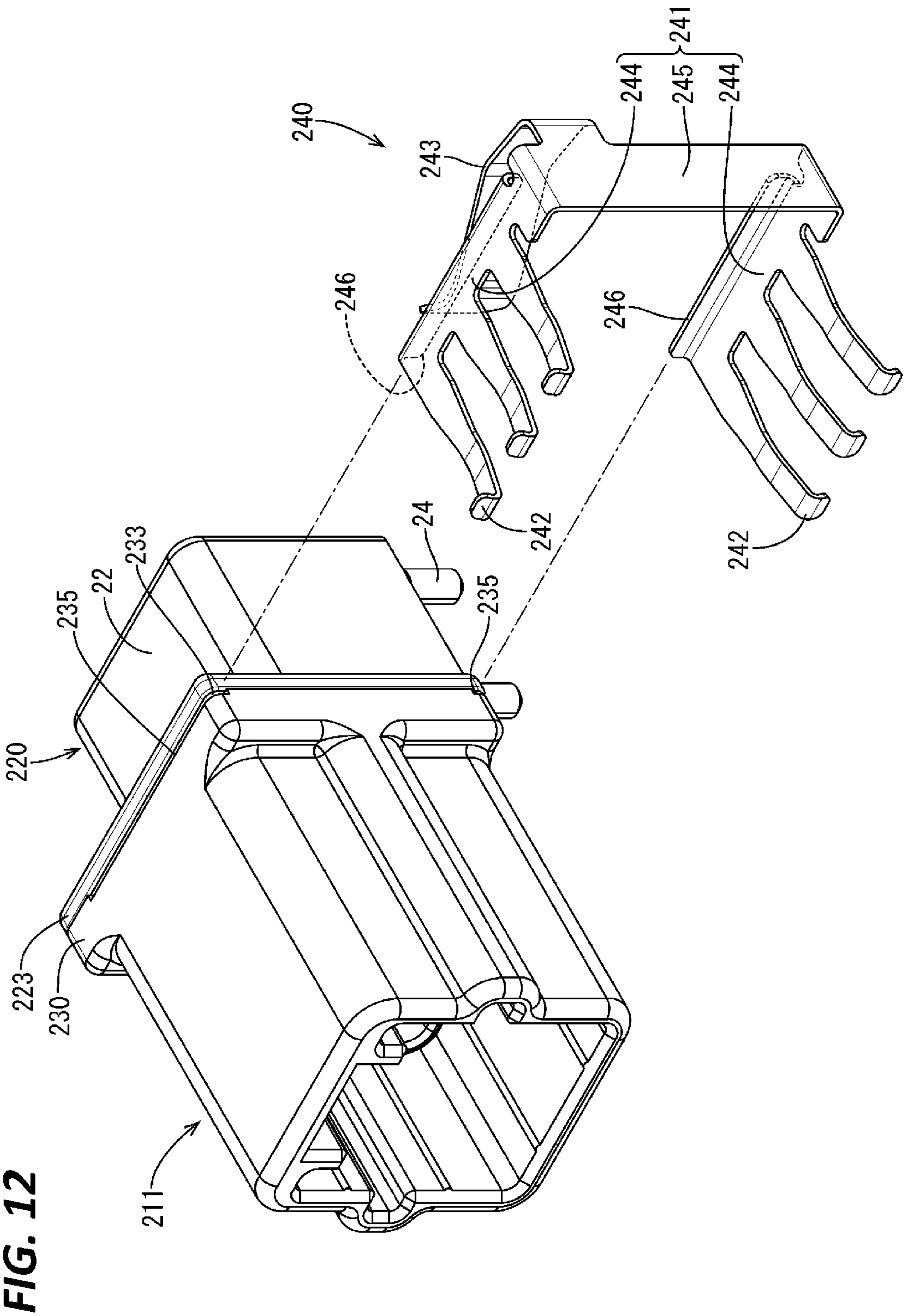
FIG. 12 is a perspective view showing the board connector before a ground spring is mounted.

As shown in FIGS. 11 and 12, the board connector 210 differs from the board connector 10 of the first embodiment in that a ground spring 240 is retrofit laterally to the board connector 210 having the ground spring 240 not mounted thereon yet. As shown in FIG. 13, the board connector 210 is mounted on a circuit board 50 accommodated inside a device 260.

[Board Connector]

The board connector 210 includes a housing 211 to be mounted on the circuit board 50, an outer conductor 220 to be attached to the housing 221, a dielectric 19 to be accommodated inside the outer conductor 220, inner conductors 18 to be accommodated inside the dielectric 19 and the ground spring 240 to be connected to the outer conductor 220.

[Ground Spring]

As shown in FIG. 12, the ground spring 240 can be retrofit to the outer conductor 220. Retrofitting means that the ground spring 240 can be mounted on the outer conductor 220 after the board connector 210 having the ground spring 240 not mounted thereon yet is mounted on the circuit board 50.

The ground spring 240 includes a gate-shaped mounting body portion 241 and a plurality of connection springs 242 projecting forward from the front edge of the mounting body portion 241. The mounting body portion 241 includes a pair of arm portions 244 arranged in parallel at a predetermined interval in the vertical direction and a coupling portion 245 coupling the base ends of the pair of arm portions 244.

A plurality of (three in this embodiment) the connection springs 242 are provided on each of one arm portion 244 and the other arm portion 244. In this embodiment, the connection springs 244 are not provided on the coupling portion 245.

A pair of mounting pieces 246 having a rectangular shape long in the lateral direction are provided to project inward on the rear edges of the pair of arm portions 244. One mounting piece 246 projects toward the other mounting piece 246, and the other mounting piece 246 projects toward the one mounting piece 246. The pair of mounting pieces 246 are arranged side by side in the vertical direction. The mounting piece 246 of this embodiment is formed over the entire length of the arm portion 244, and provided to have a longer dimension in a width direction (projecting direction of the arm portion 244 from the coupling portion 245) than the mounting piece 46 of the first embodiment.

A holding spring 243 is provided on the rear edge of the coupling portion 245. The holding spring 243 extends laterally (in a mounting direction on the board connector 210) from a position near an upper end part of the coupling portion 245 and is formed into a chevron shape having a top on a front side. The holding spring 243 is flexible and in resilient contact with the rear surface of a flange 223 from behind in a state mounted on the outer conductor 220. As shown in FIG. 13, a part of the flange 23 to be contacted by the top of the holding spring 243 is formed into an engaging recess 226 recessed forward. The top of the holding spring 243 is fit into and engaged with the engaging recess 226, whereby the ground spring 240 can be held not to be disengaged from the flange 223 in the vertical direction and lateral direction.

[Mounting Structure of Ground Spring]

As shown in FIG. 12, a pair of mounting recesses 235 are provided on both upper and lower sides of the rear surface of a rear wall 230 of the housing 221. The mounting recess 235 is formed by recessing the rear surface of the rear wall 230 forward. As shown in a partial enlarged view of FIG. 13, with the housing 221 and the outer conductor 220 assembled, mounting grooves 233 are formed by the mounting recesses 235 and the flange 223. The mounting grooves 233 are located between the rear wall 230 and the flange 223 and open in the vertical direction and laterally. The mounting groove 233 located on the upper side in a front view is open upward and rightward, and the mounting groove 233 located on the lower side in the front view is open downward and rightward. The pair of mounting pieces 246 of the ground spring 240 are inserted into the pair of mounting grooves 233.

A dimension in the front-rear direction of the mounting groove 233 is equal to or somewhat larger than a plate thickness of the mounting piece 246. The mounting groove 233 has a lateral dimension nearly equal to that of the rear wall 30 and is formed from the right end of the rear wall 230 to a position near a left end.

If the ground spring 240 is assembled laterally with the board connector 210 having the ground spring 240 not mounted thereon yet, the pair of mounting pieces 246 are respectively inserted into the pair of mounting grooves 233. When the ground spring 240 reaches a proper mount position, the holding spring 243 resiliently contacts the flange 223 from behind and the mounting pieces 246 are inserted into the mounting grooves 233 and resiliently contact the front surface of the flange 223. With the top of the holding spring 243 fit in the engaging recess 226, the top of the holding spring 243 is engaged with the upper edge of the engaging recess 226 from below, whereby the ground spring 240 is held not to come out upward, and the top of the holding spring 243 is engaged laterally with the side edge of the engaging recess 226, whereby the ground spring 240 is held not to come out laterally.

[Connection Structure of Ground Spring and Front Panel]

Figure 13:
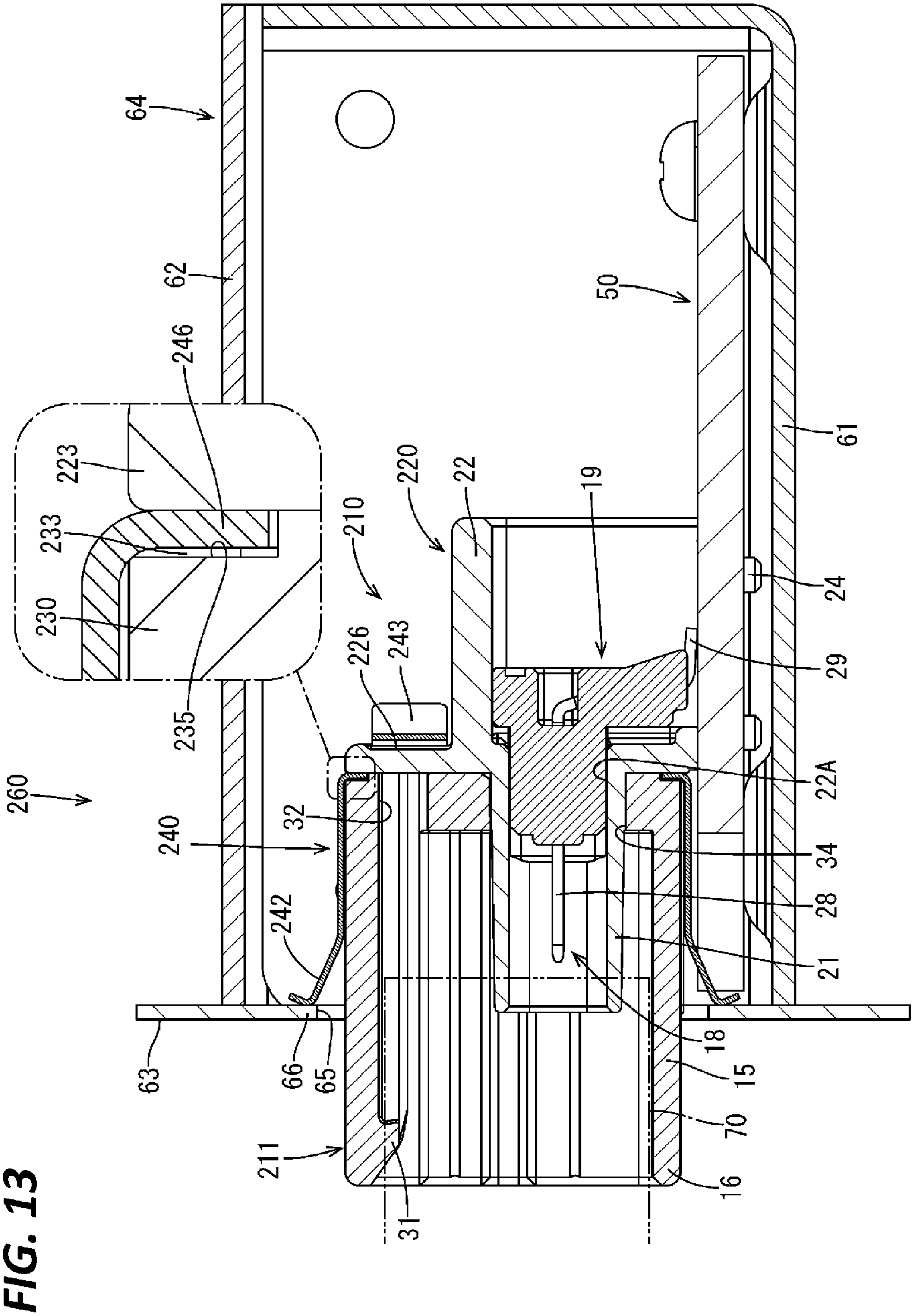
FIG. 13 is a longitudinal section showing an enclosure electrically connected to an outer conductor via the ground spring.

As shown in FIG. 13, the holding spring 243 is in resilient contact with the rear surface of the flange 223 and the connection springs 242 on the both upper and lower sides are in resilient contact with a front wall 66 of a front panel 63. Thus, an electrically conductive path from the flange 223 to the front panel 63 is shortest, wherefore shielding performance can be improved.

An electrically conductive path extending from each mounting piece 246 to the front wall 66 of the front panel 63 is branched into a plurality of parts by the plurality of connection springs 242. Since the ground spring 240 is connected to the front panel 63 at multiple contact points in this way, resistance at each contact point is reduced and shielding performance can be further improved.

[Mounting Method of Ground Spring]

The ground spring 240 is mounted on the board connector 210. The ground spring 240 is mounted laterally on the board connector 210, and the pair of mounting pieces 246 are inserted laterally into the pair of mounting grooves 233. When the ground spring 240 reaches a proper mount position, the holding spring 243 resiliently contacts the flange 223 from behind and the pair of mounting pieces 246 resiliently contact the front surface of the flange 223 from front. In this way, the ground spring 240 is electrically connected to the outer conductor 220 at a plurality of positions (three positions in this embodiment).

Subsequently, the circuit board 50 is fixed to a lower case 61, such as by screwing. By assembling an upper case 62 from above the lower case 61 and assembling the front panel 63 from the front of the lower case 61, the lower case 61, the upper case 62 and the front panel 63 are fixed, such as by screwing. In this way, an enclosure 64 is configured and the board connector 210 and the circuit board 50 are accommodated inside the enclosure 64 with the receptacle 15 passed through a connector insertion hole 65.

At this time, front end parts of the plurality of connection springs 242 are pressed against and brought into resilient contact with the front wall 66 of the front panel 63 from behind. In this way, the ground spring 240 is electrically connected to the enclosure 64 while being held in contact with the enclosure 64 at multiple points. Accordingly, the outer conductor 220 is shield-connected to the enclosure 64 via the ground spring 240. Apart from this, the outer conductor 220 is shield-connected to the enclosure 64 via a plurality of board connecting portions 24 and the circuit board 50, but a distance to the enclosure 64 can be short and the outer conductor 220 resiliently contacts the enclosure 64 with shield connection by the ground spring 240. Thus, a connected state is stable and shielding performance can be improved. That is, since the flange 223 is sandwiched by the holding spring 243 and the mounting pieces 246, a sufficient contact pressure can be secured and stable shield connection is possible.

Functions and Effects of Second Embodiment

The mounting body portion 241 includes the pair of arm portions 244 and the coupling portion 245 coupling the pair of arm portions 244, and the plurality of connection springs 242 are provided on each of the pair of arm portions 244.

Since the plurality of connection springs 242 are provided on each of the pair of arm portions 244, shield connection to the enclosure 64 is possible at multiple contact points and shielding performance can be further improved.

OTHER EMBODIMENTS (1) Although the connection springs 42 are provided on both the pair of arm portions 44 and the coupling portion 45 in the first embodiment, the connection springs may be provided only on the coupling portion or may be provided only on the pair of arm portions.

(2) Although the ground spring 240 is assembled from right in the front view in the second embodiment, the ground spring may be assembled from left in the front view.

(3) Although the rear surface of the flange 23 is formed to be flat in the first embodiment, an engaging recess may be provided in the rear surface of the flange and the top of the holding spring may be fit into this engaging recess as in the second embodiment. By doing so, the holding spring is even less likely to be disengaged from the flange.

(4) Although the ground spring is integrally configured in the first and second embodiments, the ground spring may be composed of a pair of half bodies. In that case, the ground spring may be composed of a pair of divided left and right half bodies and the respective half bodies may be retrofit to the board connector from both left and right sides.

(5) One, three or more inner conductors 18 may be provided.

(6) The outer conductor may be formed by press-working a metal plate material.

(7) Although the housing and the outer conductor are fixed by press-fitting, these may be fixed by heat crimping.

LIST OF REFERENCE NUMERALS

10: board connector
- 11: housing, 15: receptacle, 16: front end part, 18: inner conductor, 19: dielectric

20: outer conductor
- 21: tube portion, 22: dielectric surrounding portion, 22A: dielectric holding portion, 22B: retaining protrusion, 23: flange, 24: board connecting portion, 26: locking recess, 27: inner conductor accommodation chamber, 28: terminal connecting portion, 29: board connecting portion

30: rear wall
- 31: lock portion, 32: mold removal hole, 33: mounting groove, 34: outer conductor mounting hole, 35: mounting recess

40: ground spring
- 41: mounting body portion, 42: connection spring, 43: holding spring, 44: arm portion, 45: coupling portion, 46: mounting piece

50: circuit board
- 51: outer conductor through hole, 52: inner conductor land, 53: signal electrically conductive path, 54: ground electrically conductive path

60: device
- 61: lower case, 62: upper case, 63: front panel, 64: enclosure, 65: connector insertion hole, 66: front wall

70: mating connector

210: board connector
- 211: housing

220: outer conductor
- 223: flange, 226: engaging recess

230: rear wall
- 233: mounting groove, 235: mounting recess

240: ground spring
- 241: mounting body portion, 242: connection spring, 243: holding spring, 244: arm portion, 245: coupling portion, 246: mounting piece

260: device

What is claimed is:

1. A board connector to be mounted on a circuit board, comprising:
- a housing including a receptacle open forward and a rear wall provided on a side opposite to a front end part where the receptacle is open;
- an outer conductor fixed to the housing through the rear wall;
- an insulating dielectric disposed inside the outer conductor;
- an inner conductor disposed inside the dielectric; and
- a ground spring to be connected to the outer conductor,
- the outer conductor including a flange to be disposed along the rear wall of the housing, and
- the ground spring including a mounting piece to be inserted between the rear wall and the flange.

2. The board connector of claim 1, wherein the ground spring includes a gate-shaped mounting body portion and a plurality of connection springs projecting forward from a front edge of the mounting body portion, and the mounting piece is provided to project inward from a rear edge of the mounting body portion.

3. A board connector to be mounted on a circuit board, comprising:
- a housing including a receptacle open forward and a rear wall provided on a side opposite to a front end part where the receptacle is open;
- an outer conductor fixed to the housing through the rear wall;
- an insulating dielectric disposed inside the outer conductor;
- an inner conductor disposed inside the dielectric; and
- a ground spring to be connected to the outer conductor,
- the outer conductor including a flange to be disposed along the rear wall of the housing, and
- the ground spring including a mounting piece to be inserted between the rear wall and the flange,
- wherein the ground spring includes a gate-shaped mounting body portion and a plurality of connection springs projecting forward from a front edge of the mounting body portion, and the mounting piece is provided to project inward from a rear edge of the mounting body portion,
- wherein the mounting body portion includes a pair of arm portions and a coupling portion coupling the pair of arm portions, and a plurality of the connection springs are provided on each of both the pair of arm portions and the coupling portion or each of either the pair of arm portions or the coupling portion.

4. A board connector to be mounted on a circuit board, comprising:
- a housing including a receptacle open forward and a rear wall provided on a side opposite to a front end part where the receptacle is open;
- an outer conductor fixed to the housing through the rear wall;
- an insulating dielectric disposed inside the outer conductor;

an inner conductor disposed inside the dielectric; and a ground spring to be connected to the outer conductor, the outer conductor including a flange to be disposed along the rear wall of the housing, and the ground spring including a mounting piece to be inserted between the rear wall and the flange, wherein the flange includes a locking recess for retaining the ground spring by having the mounting piece accommodated inside.

5. The board connector of claim 1, wherein the ground spring includes a holding spring to be brought into resilient contact with the flange from behind.

6. A device, comprising:

the board connector of claim 1;

a circuit board having the board connector mounted thereon; and an enclosure made of metal, the circuit board being accommodated inside the enclosure, the enclosure being electrically connected to the outer conductor via the ground spring.

* * * * *